(12) United States Patent
Walker et al.

(10) Patent No.: US 11,377,013 B2
(45) Date of Patent: Jul. 5, 2022

(54) TRI-FOLD LIFTGATE

(71) Applicant: ANTHONY LIFTGATES, INC., Pontiac, IL (US)

(72) Inventors: Kurt Walker, Pontiac, IL (US); Brandon Walker, Pontiac, IL (US); Jesse Justus, Pontiac, IL (US)

(73) Assignee: ANTHONY LIFTGATES, INC., Pontiac, IL (US)

( * ) Notice: Subject to any disclaimer, the term of this patent is extended or adjusted under 35 U.S.C. 154(b) by 0 days.

(21) Appl. No.: 16/988,444

(22) Filed: Aug. 7, 2020

(65) Prior Publication Data

US 2021/0039543 A1 Feb. 11, 2021

Related U.S. Application Data

(60) Provisional application No. 62/884,992, filed on Aug. 9, 2019.

(51) Int. Cl.
*B60P 1/44* (2006.01)
*B60P 1/02* (2006.01)

(52) U.S. Cl.
CPC .............. *B60P 1/4421* (2013.01); *B60P 1/02* (2013.01)

(58) Field of Classification Search
CPC ....... B60P 1/4492; B60P 1/445; B60P 1/4442; B60P 1/4421; B60P 1/02; B60P 1/022; B60P 1/44; B60P 1/4485; B60P 1/4414; A61G 3/06; A61G 3/061; A61G 3/062; A61G 3/066; A61G 3/068
See application file for complete search history.

(56) References Cited

U.S. PATENT DOCUMENTS

| | | |
|---|---|---|
| 2,459,045 A | 1/1949 | Pride |
| 3,734,239 A | 5/1973 | Martin et al. |
| 3,795,329 A | 3/1974 | Martin et al. |
| 3,800,915 A | 4/1974 | Himes |
| 4,087,007 A | 5/1978 | Drews |
| 5,263,808 A | 11/1993 | Kent |
| 5,449,267 A | 9/1995 | Ablabutyan |

(Continued)

FOREIGN PATENT DOCUMENTS

| | | |
|---|---|---|
| CN | 110254331 | 9/2019 |
| GB | 2106857 | 4/1983 |

(Continued)

*Primary Examiner* — Glenn F Myers
(74) *Attorney, Agent, or Firm* — Barnes & Thornburg LLP; Mark J. Nahnsen

(57) ABSTRACT

A liftgate in accordance with the present disclosure includes a lift mechanism and a moveable load platform. The load platform includes a proximal deck section, a distal deck section, and a center deck section positioned between the proximal deck section and the distal deck section. The load platform is selectively vertically movable between a lowered position and a raised position. The proximal deck section, center deck section, and distal deck section are pivotally coupled to one another such that the load platform is selectively moveable between an extended-operational position, wherein all of the deck sections are located substantially coplanar with one another for supporting cargo, and a retracted-stored position wherein the deck sections are folded with respect to one another and are located substantially parallel and adjacent to one another.

19 Claims, 13 Drawing Sheets

(56) References Cited

U.S. PATENT DOCUMENTS

| | | | |
|---|---|---|---|
| 5,513,943 A * | 5/1996 | Lugash | B60P 1/4421 |
| | | | 187/244 |
| 5,672,041 A | 9/1997 | Ringdahl et al. | |
| 6,379,102 B1 | 4/2002 | Kameda | |
| 7,491,026 B2 | 2/2009 | Hooker | |
| 8,740,539 B2 | 6/2014 | Ablabutyan | |
| 9,481,282 B2 | 11/2016 | Walker | |
| 2003/0057243 A1 * | 3/2003 | Himel, Jr. | B60R 9/06 |
| | | | 224/519 |
| 2008/0143280 A1 * | 6/2008 | Rock | B60P 1/4471 |
| | | | 318/16 |
| 2012/0121369 A1 * | 5/2012 | Ablabutyan | B60P 1/4421 |
| | | | 414/540 |
| 2015/0122965 A1 * | 5/2015 | Arzouman | B66F 5/04 |
| | | | 248/423 |
| 2015/0232309 A1 * | 8/2015 | Jaipaul | B66F 7/04 |
| | | | 414/800 |
| 2016/0075270 A1 * | 3/2016 | Walker | B60P 1/4492 |
| | | | 414/540 |
| 2016/0272102 A1 * | 9/2016 | Hambardzumyan | |
| | | | B60P 1/4421 |
| 2018/0236923 A1 * | 8/2018 | Wu | B65G 69/001 |

FOREIGN PATENT DOCUMENTS

| | | |
|---|---|---|
| GB | 2324515 | 10/1998 |
| JP | 2014-46852 | 3/2014 |

* cited by examiner

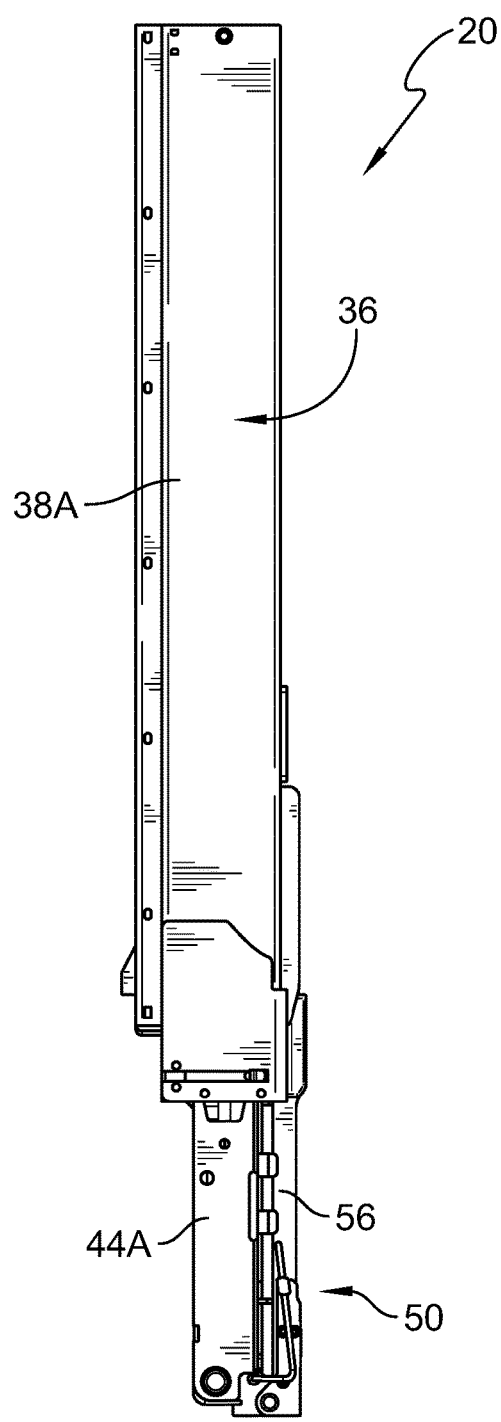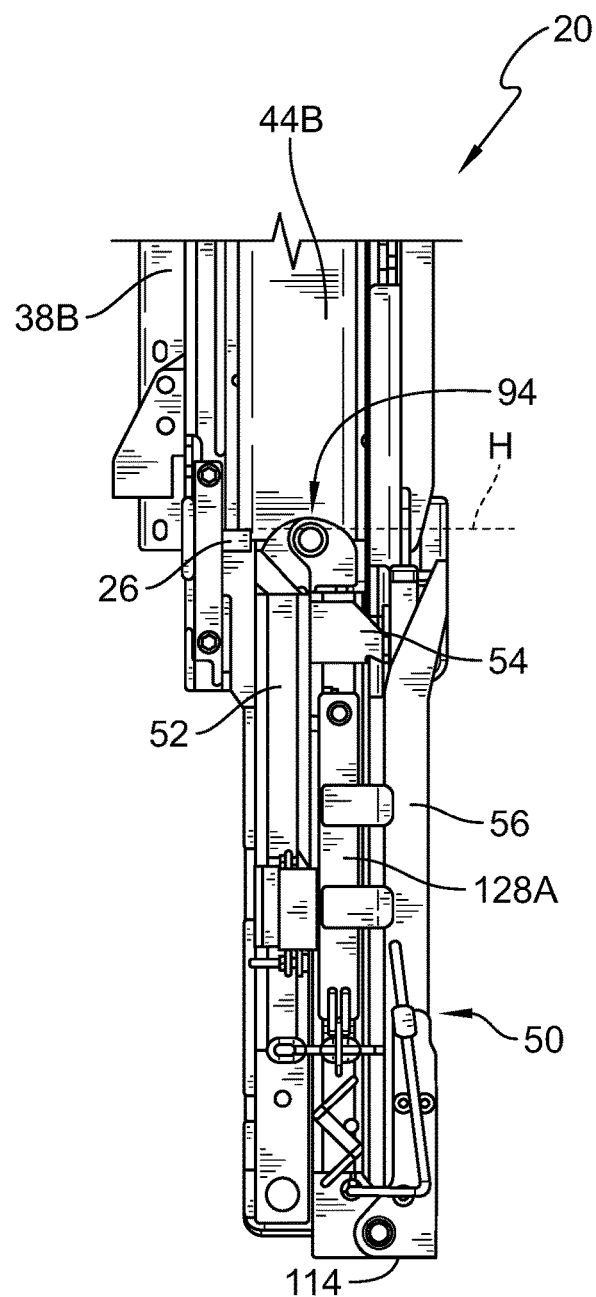
FIG. 12
FIG. 13

TRI-FOLD LIFTGATE

CROSS REFERENCE TO RELATED APPLICATIONS

This application claims the benefit of priority under 35 U.S.C. § 119(e) to U.S. Provisional Patent Application No. 62/884,992, filed Aug. 9, 2019. The disclosure set forth in the referenced application is incorporated herein by reference in its entirety.

BACKGROUND

The present disclosure is directed to a liftgate having a tri-fold load platform that is selectively moveable between a lowered position and a raised position, such that cargo can be loaded onto or unloaded from the load platform.

Liftgates are used in connection with vehicles such as trucks and trailers to facilitate the loading and unloading of cargo from the vehicle when the cargo needs to be moved vertically between a loading surface, such as a ground surface or a dock surface, and the surface of the vehicle cargo floor. The liftgate is typically mounted to the rear end of a truck or trailer to facilitate loading and unloading of the truck or trailer. The dimensions of the cargo support surface of the load platform often limits the size of the cargo that can be handled by the load platform. The dimensions of the load platform are often limited by the ability to move the load platform to a retracted-stored position without interfering with access to the cargo section of the vehicle.

SUMMARY

A liftgate in accordance with the present disclosure includes a lift mechanism and a moveable load platform. The load platform includes a proximal deck section, a distal deck section, and a center deck section positioned between the proximal deck section and the distal deck section. The load platform is selectively vertically movable between a lowered position and a raised position. The proximal deck section, center deck section, and distal deck section are pivotally coupled to one another such that the load platform is selectively moveable between an extended-operational position, wherein all of the deck sections are located substantially coplanar with one another for supporting cargo, and a retracted-stored position wherein the deck sections are folded with respect to one another and are located substantially parallel and adjacent to one another. When the load platform is in the extended-operational position, the distal deck section extends outwardly from a distal end of the center deck section such that the distal deck section forms part of a load-bearing portion of the load platform to support a load during movement between the lowered and raised positions without the need for any external support from a support structure such as a ground surface or loading dock.

In illustrative embodiments, the liftgate includes a lock mechanism having a latch that is selectively linearly slidable between a locked position and a retention position. When the load platform is in the extended-operational position and the latch is located in the locked position, the latch couples and locks the center deck section to the proximal deck section to block pivotal movement of the center deck section with respect to the proximal deck section. When the load platform is in the retracted-stored position and the latch is located in the retention position, the latch couples the distal deck section to the center deck section to block pivotal movement of the distal deck section with respect to the center deck section.

In illustrative embodiments, when the load platform is in the extended-operational position, the distal deck section is cantilevered outwardly from a distal end of the center deck section such that the distal deck section of the load platform is self-supporting without the need for any external support.

In illustrative embodiments, one or more support members are coupled to the distal deck section of the load platform to support the distal deck section when the load platform is in the extended-operational position.

BRIEF DESCRIPTIONS OF THE DRAWINGS

The detailed description particularly refers to the accompanying figures in which:

FIG. 12 is a side elevation view of the liftgate of FIG. 6;

FIG. 13 is a view similar to FIG. 12 showing a portion of the lift mechanism removed to expose the load platform;

Figure 22:
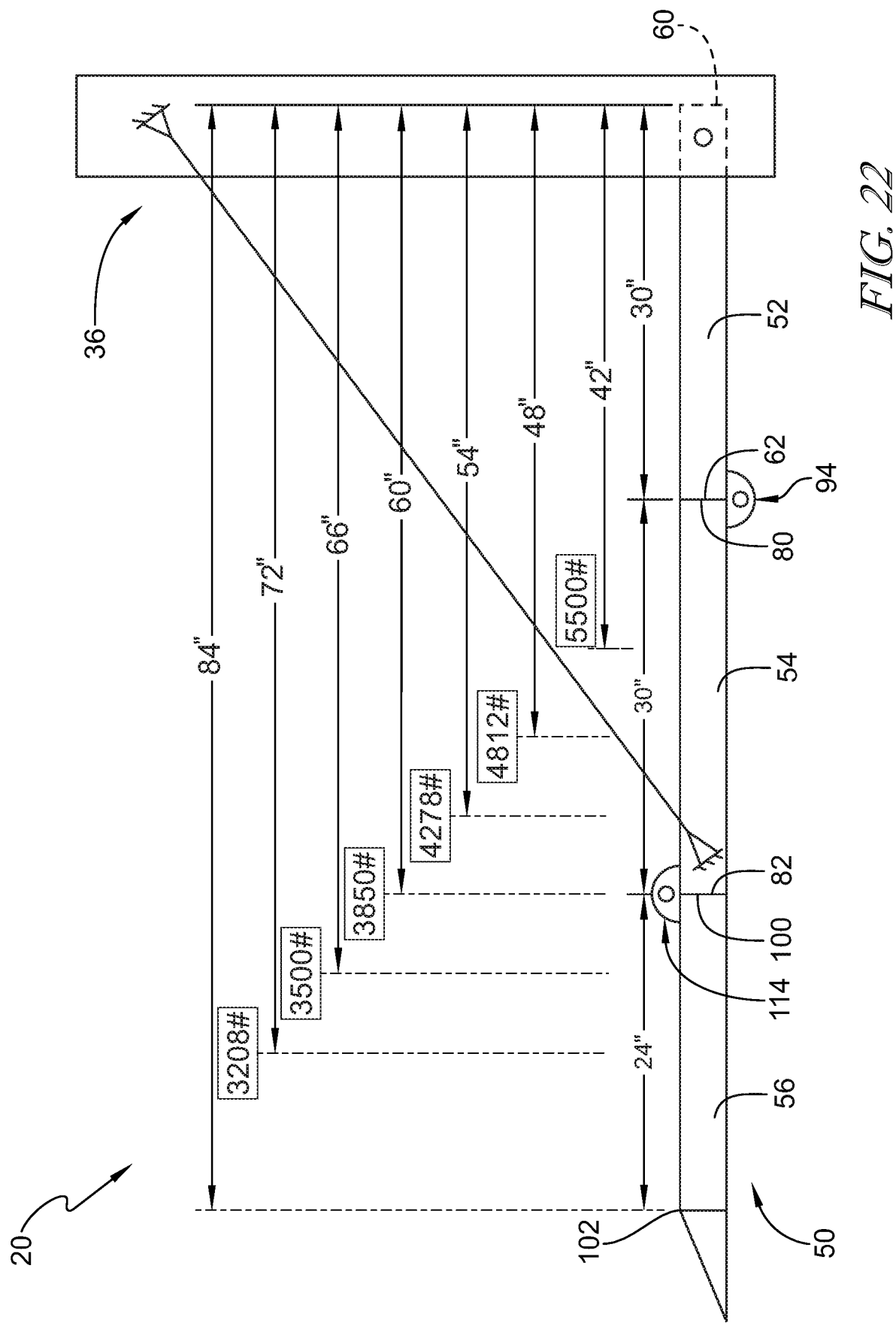
Figure 23:
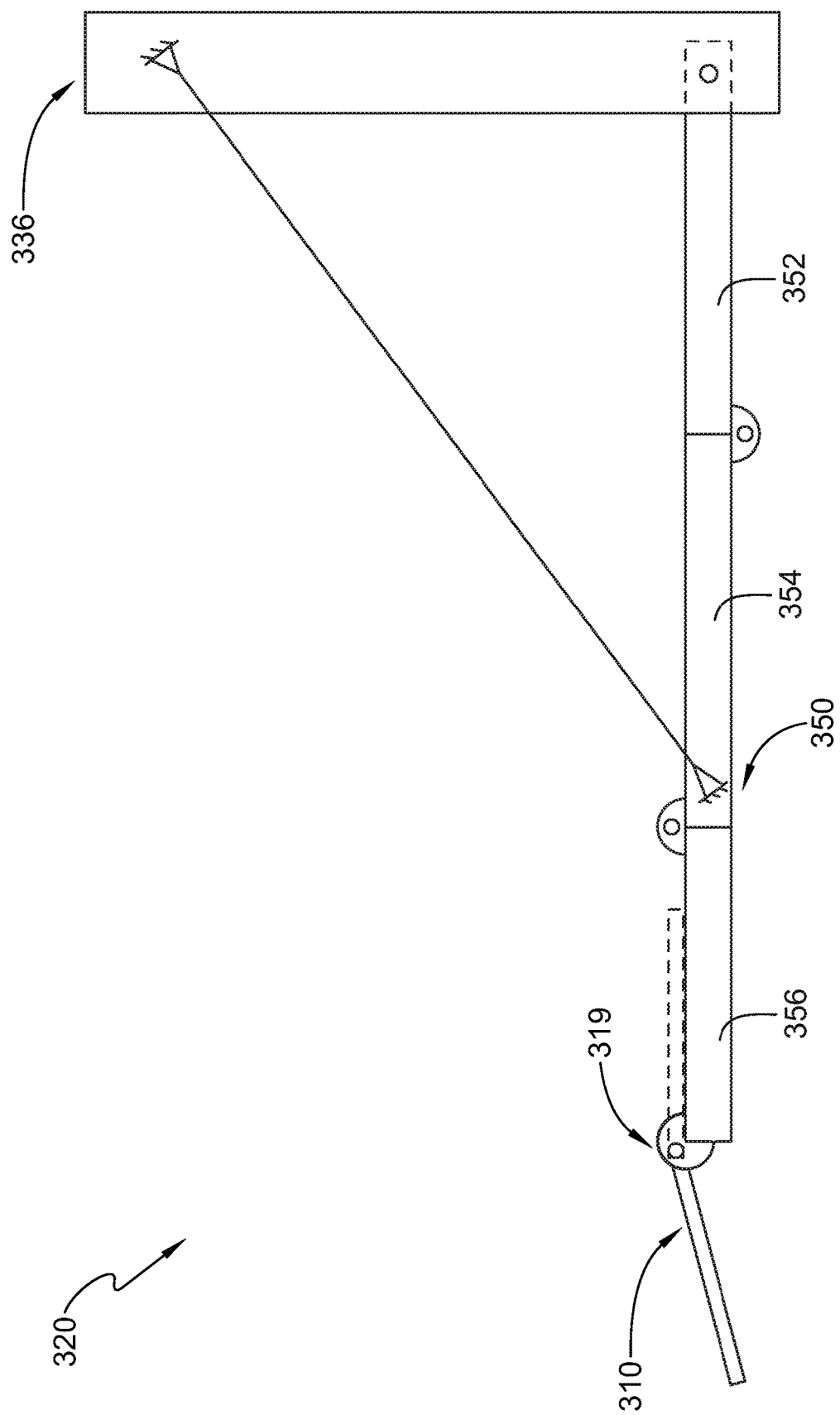

FIG. 22 is a side elevational view of the liftgate showing exemplary load capacities as it relates to distance from a proximal end of the load platform in accordance with embodiments of the present disclosure; and FIG. 23 is a side elevational view of another embodiment of a liftgate in accordance with the present disclosure showing a foldable end ramp pivotably coupled to a load platform of the liftgate.

DETAILED DESCRIPTION

The present disclosure is directed to a liftgate for a vehicle having a load platform that is selectively moveable between a lowered position and a raised position for unloading cargo from the vehicle onto the load platform and for loading cargo from the load platform onto the vehicle. An embodiment of the liftgate of the present disclosure is shown in FIGS. 1-13 as liftgate 20. Liftgate 20 is adapted to be mounted to the rear or aft end of a vehicle 22. Vehicle 22 may comprise a truck, trailer or other cargo conveying apparatus. Vehicle 22 includes a substantially planar and horizontal cargo floor 24 having a substantially linear rear edge 26. Vehicle 22 may include wheels 28 rotatably mounted to vehicle 22 for rotation about one or more rotational axes 30. Rear edge 26 of cargo floor 24 and rotational axes 30 of wheels 28 are substantially parallel to one another. Vehicle 22 may also include an under-ride bar 29. Vehicle 22 includes a transverse axis that is substantially parallel to rear edge 26 of cargo floor 24 and rotational axes 30 of wheels 28, and a longitudinal axis that extends from the aft end to the front end of vehicle 22 substantially perpendicular to the transverse axis and to rear edge 26 of cargo floor 24 and rotational axes 30 of wheels 28. The top surface of cargo floor 24 of vehicle 22 is typically located at a vertical height above a loading surface. The loading surface may comprise the surface of the ground, road, parking lot or the like on which wheels 28 of vehicle 22 are supported or the surface of a loading dock, sidewalk or the like which may be located at a vertical height above the surface on which the wheels 28 are supported.

Figure 1:
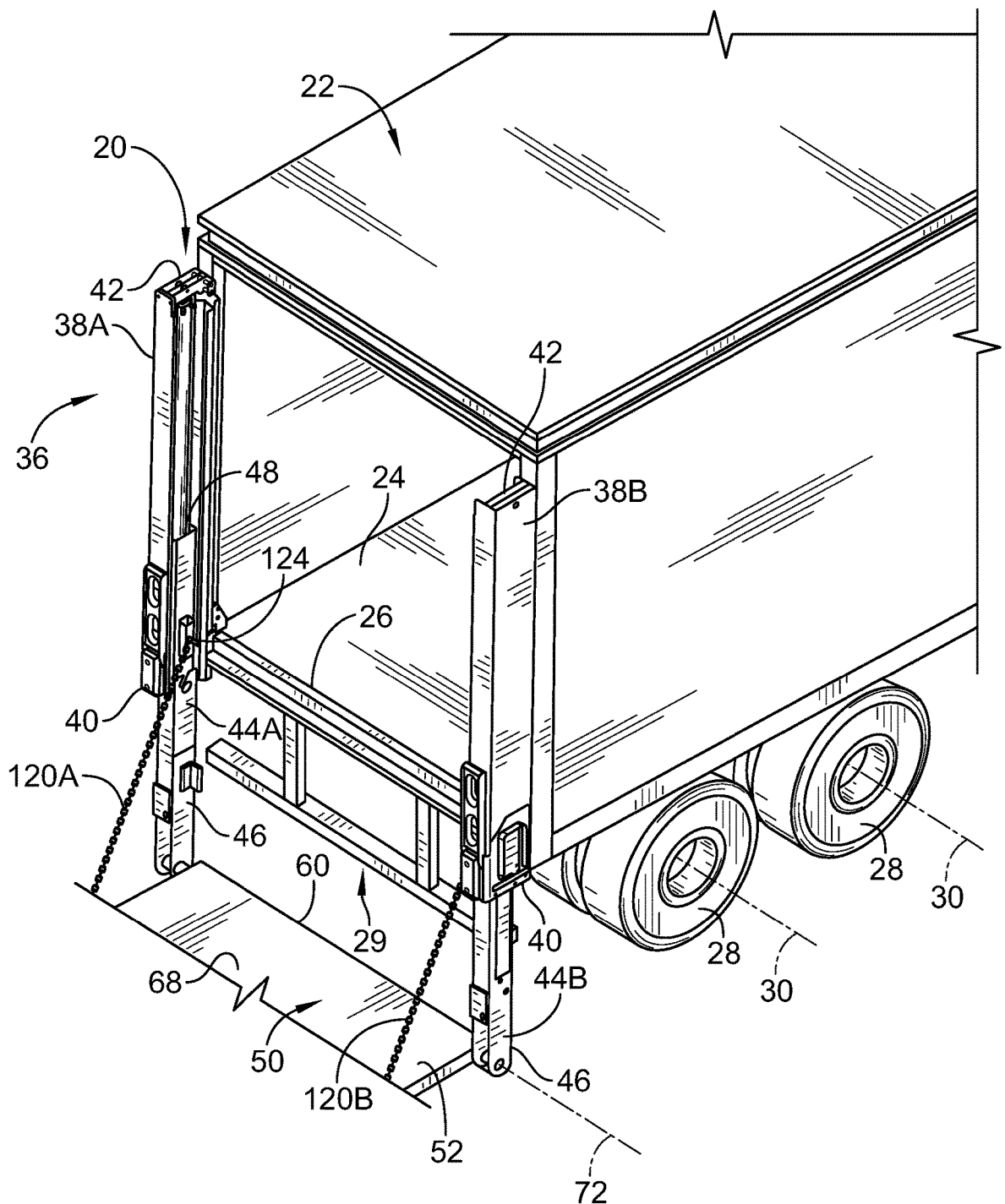
FIG. 1 is a partial perspective view of an exemplary liftgate in accordance with the present disclosure shown mounted to the rear end of a vehicle.
Figure 2:
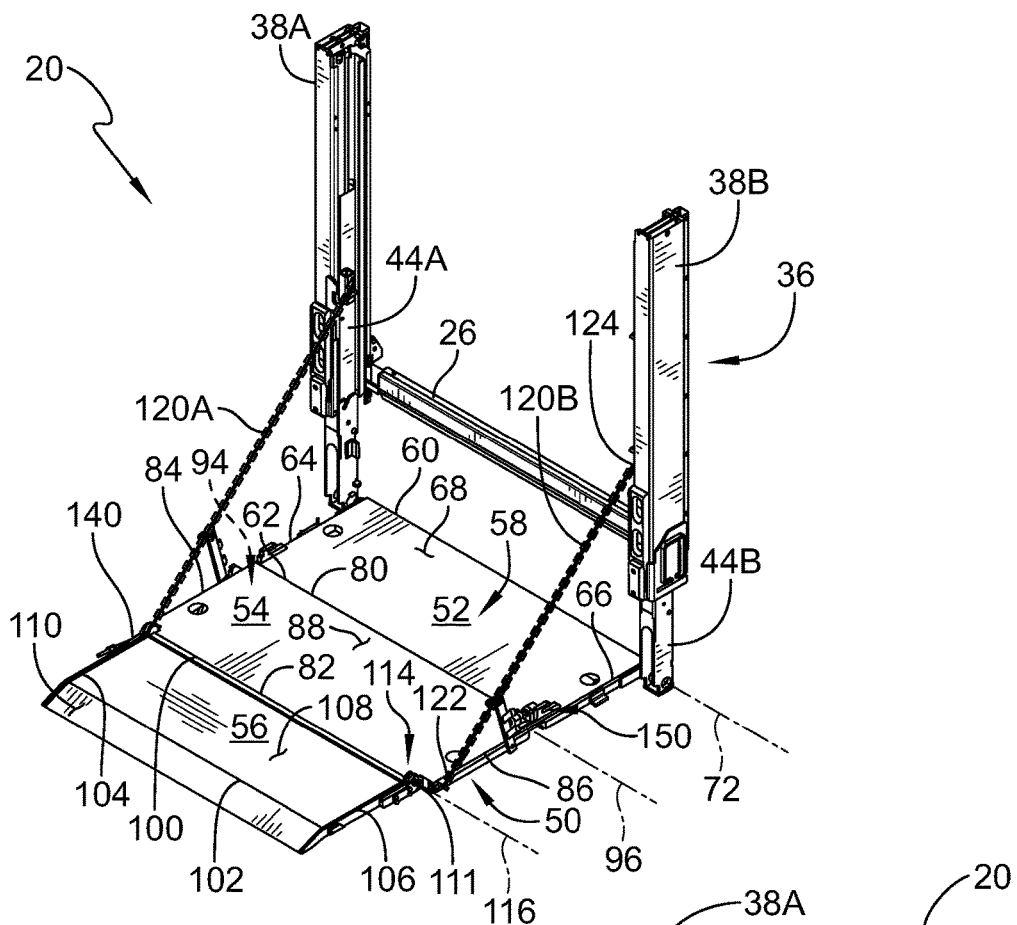
FIG. 2 is a perspective view of the liftgate of FIG. 1 showing a load platform of the liftgate in an extended-operational position and suggesting that the load platform is movable between a lowered position, shown in FIG. 2, and a raised position, shown in FIG. 3.
Figure 3:
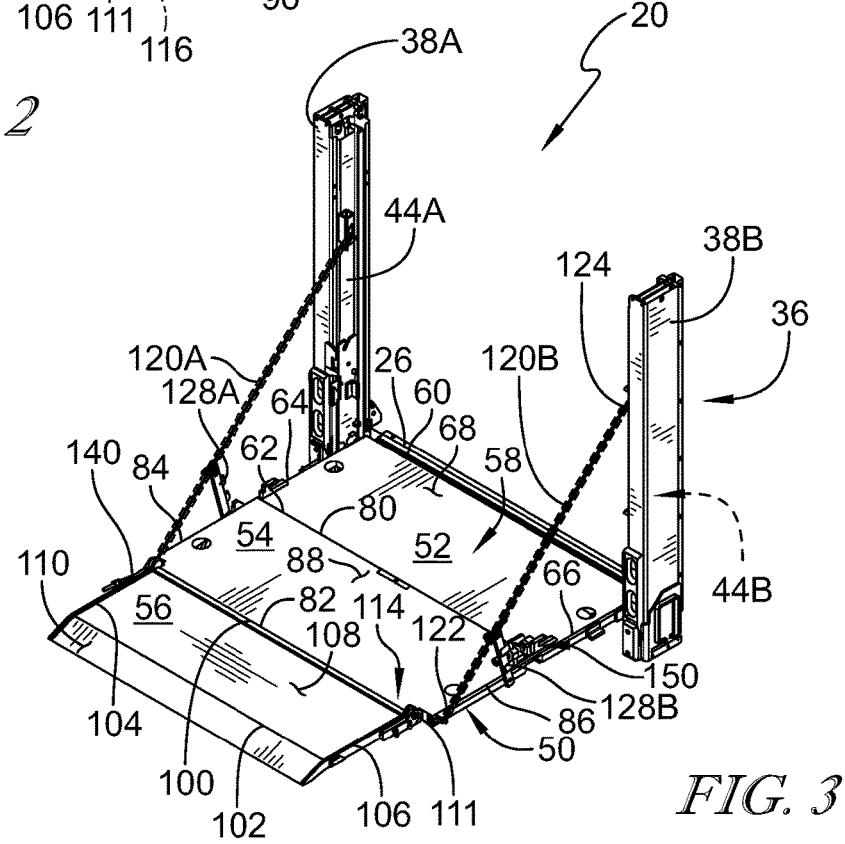
FIG. 3 is a view similar to FIG. 2 showing the load platform in the raised position.

Liftgate 20 includes a lift mechanism 36 and a load platform 50 coupled to the lift mechanism 36 as shown in FIGS. 1-3. Lift mechanism 36 includes columns 38A and 38B that are adapted to be stationarily mounted to the aft end of vehicle 22 adjacent rear edge 26 of cargo floor 24, as shown in FIG. 1. Each column 38A-B is substantially linear and extends substantially vertically between a bottom end 40 and a top end 42. Columns 38A-B are spaced apart from one another and are substantially parallel to one another and are located at opposite ends of rear edge 26 of cargo floor 24. Lift mechanism 36 also includes lifting posts 44A and 44B. Lifting post 44A is operatively coupled to column 38A and lifting post 44B is operatively coupled to column 38B. Each lifting post 44A-B is substantially linear and extends substantially vertically between a bottom end 46 and a top end 48. Lifting post 44A is selectively vertically slidable with respect to column 38A between a raised position wherein bottom end 46 of lifting post 44A is adjacent bottom end 40 of column 38A and a lowered position wherein bottom end 46 of lifting post 44A is located adjacent the surface that supports wheels 28 and spaced apart from bottom end 40 of column 38A. Lifting post 44B is similarly selectively vertically movable with respect to column 38B between a lowered position and a raised position. Lifting posts 44A-B are conjointly moveable between their raised position and their lowered position by a drive mechanism, such that lifting posts 44A-B move vertically upwardly and downwardly in unison with one another.

Load platform 50 is pivotally coupled to lift mechanism 36 and is selectively moveable between raised and lowered positions with lift mechanism 36 as shown in FIGS. 2 and 3. Load platform 50 includes a proximal deck section 52 pivotably coupled to lift mechanism 36 for movement about a pivot axis 72, a center deck section 54 pivotably coupled to proximal deck section 52 for movement about a pivot axis 96, and a distal deck section 56 pivotably coupled to center deck section 54 for movement about a pivot axis 116. Load platform 50 is foldable as shown in FIGS. 2-7 for selective movement between an extended-operational position (e.g., FIG. 2) where the proximal, center, and distal deck sections 52, 54, 56 are located substantially coplanar with one another for supporting a load and a retracted-stored position (e.g., FIG. 6) where the proximal, center, and distal deck sections 52, 54, 56 are folded with respect to one another and are located substantially parallel and adjacent to one another.

Figure 6:
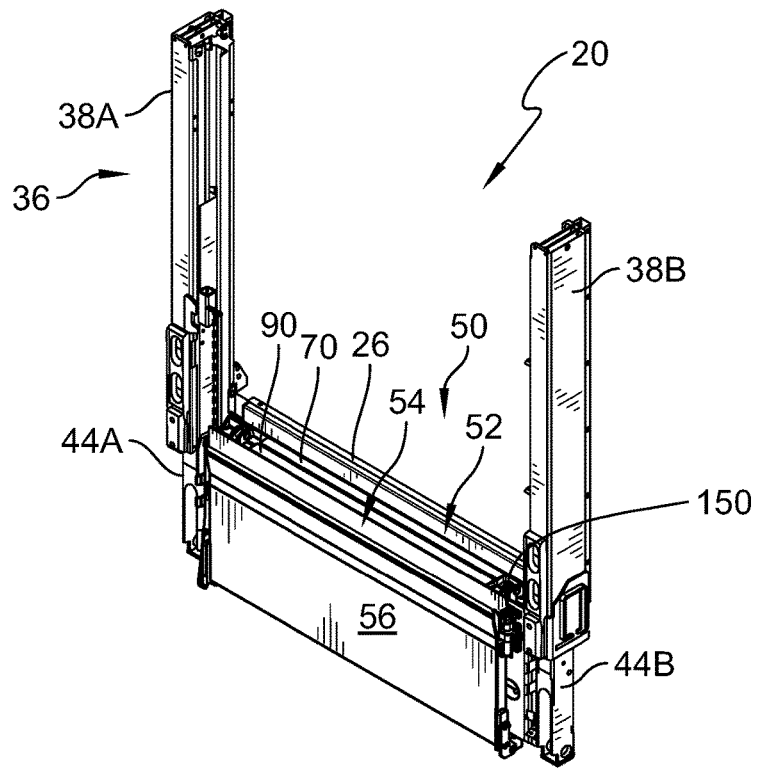
FIG. 6 is a view similar to FIG. 5 showing the load platform in a retracted-stored position.

As shown in FIG. 2, proximal deck section 52 is substantially rectangular and includes a substantially linear proximal edge 60 and a spaced apart and substantially parallel and linear distal edge 62. Proximal edge 60 and distal edge 62 extend substantially parallel to rear edge 26 of cargo floor 24 and rotational axes 30 of wheels 28. Proximal deck section 52 also includes a substantially linear first side edge 64 and a spaced apart and substantially parallel and linear second side edge 66. First side edge 64 and second side edge 66 extend between and substantially perpendicular to proximal edge 60 and distal edge 62. Proximal deck section 52 includes a substantially planar floor 68 mounted on a base that extends between proximal edge 60, distal edge 62, first side edge 64 and second side edge 66. Floor 68 may comprise a plate, such as checkered or diamond plate. Floor 68 has a substantially planar top surface and is adapted to support cargo transferred from cargo floor 24. Proximal deck section 52 includes a substantially planar distal end wall 70 that extends downwardly from floor 68 at distal edge 62 of proximal deck section 52 substantially perpendicular to floor 68, as shown in FIG. 6. Proximal edge 60 of proximal deck section 52 is pivotally coupled to bottom ends 46 of lifting posts 44A-B for pivotal movement about a linear pivot axis 72, as shown in FIG. 2. Proximal deck section 52 extends between bottom ends 46 of lifting posts 44A and 44B with bottom end 46 of lifting post 44A being located adjacent first side edge 64 of proximal deck section 52 and bottom end 46 of lifting post 44B being located adjacent second side edge 66 of proximal deck section 52. Pivot axis 72 is substantially parallel to rear edge 26 of cargo floor 24 and rotational axes 30 of wheels 28 of vehicle 22.

Center deck section 54 of liftgate 20 is substantially rectangular and includes a substantially linear proximal edge 80 and a spaced apart and substantially parallel and linear distal edge 82, as shown in FIG. 2. Proximal edge 80 and distal edge 82 are substantially parallel to one another and to proximal edge 60 and distal edge 62 of proximal deck section 52. Center deck section 54 also includes a substantially linear first side edge 84 and a spaced apart and substantially parallel and linear second side edge 86. First side edge 84 and second side edge 86 extend substantially perpendicularly between proximal edge 80 and distal edge 82. First side edge 84 of center deck section 54 is located substantially collinear with first side edge 64 of proximal deck section 52 when proximal deck section 52 and center deck section 54 are in their substantially horizontal extended-operational positions. Second side edge 86 of center deck section 54 is located substantially collinear with second side edge 66 of proximal deck section 52 when proximal deck section 52 and center deck section 54 are in their substantially horizontal extended-operational positions. Center deck section 54 includes a substantially planar floor 88 mounted on a base. Floor 88 has a substantially planar top surface. Floor 88 may be formed from a plate, such as checkered plate.

Figure 4:
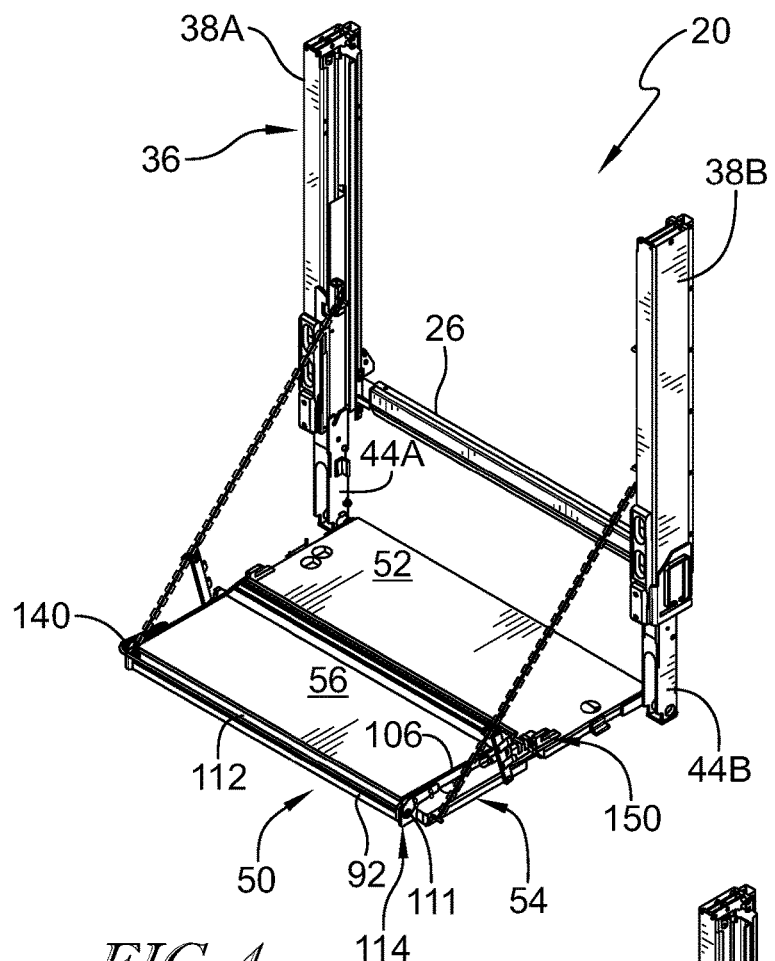
FIG. 4 is a view similar to FIG. 2 showing a distal deck section of the load platform pivoted relative to a center deck section.
Figure 5:
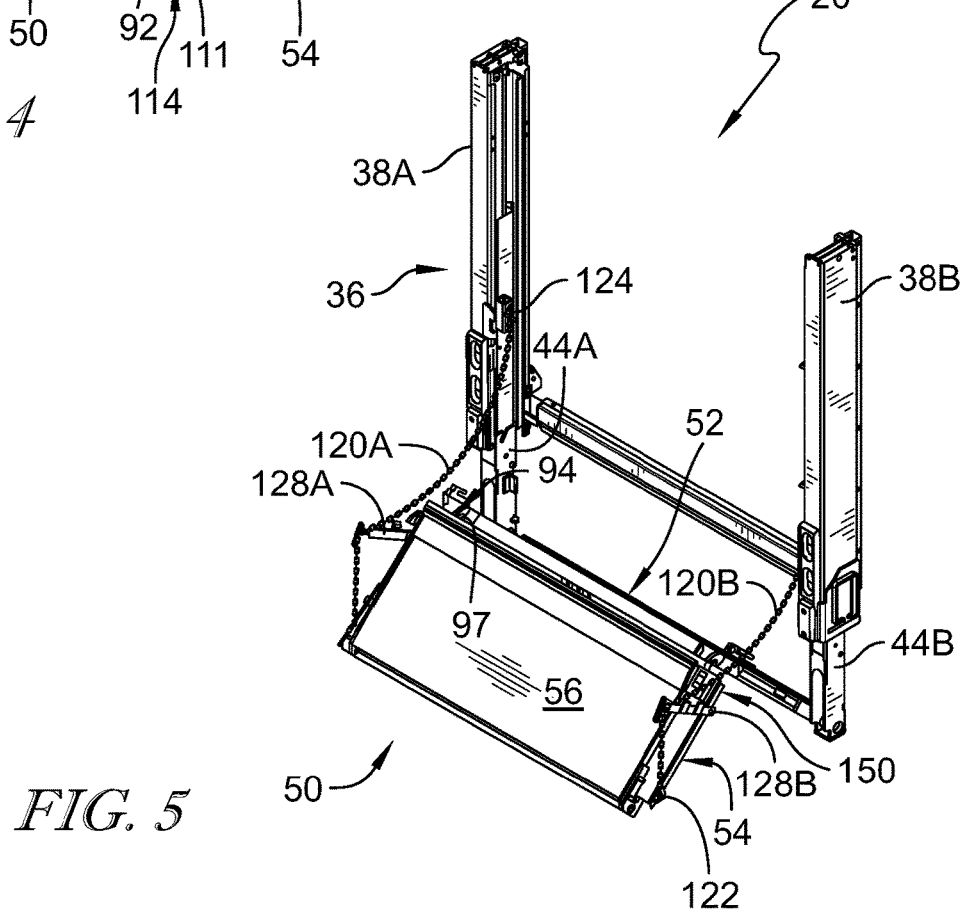
FIG. 5 is a view similar to FIG. 4 showing a proximal deck section of the load platform partially pivoted relative to a lift mechanism of the load platform and the center deck section partially pivoted relative to the proximal deck section.

Center deck section 54 includes a substantially planar proximal end wall 90 that extends downwardly from proximal edge 80 and perpendicular to floor 88, as shown in FIG. 6. Center deck section 54 includes a substantially planar distal end wall 92 that extends downwardly from distal edge 82 and substantially perpendicular to floor 88, as shown in FIG. 4. Proximal end wall 90 and distal end wall 92 are spaced apart from one another and are substantially parallel to one another. Proximal end wall 90 of center deck section 54 is adapted to be substantially parallel to and in abutting engagement with distal end wall 70 of proximal deck section 52 when proximal deck section 52 and center deck section 54 are in the extended-operational position. This engagement allows load forces from the central deck section 54 to be supported by the proximal deck section 52. One or more hinges 94 pivotally couple proximal edge 80 of center deck section 54 to distal edge 62 of proximal deck section 52 for pivotal movement of proximal deck section 52 and center deck section 54 with respect to one another about a substantially linear pivot axis 96, as shown in FIGS. 2 and 5. Pivot axis 96 is spaced apart from and substantially parallel to pivot axis 72 and rear edge 26 of cargo floor 24. In the illustrative embodiment, pivot axis 96 is located below a plane including the top surfaces of floors 68 and 88 of proximal deck section 52 and center deck section 54 when load platform 50 is in the extended-operational position. Hinges 94 include pins 97 to allow for pivoting of deck sections 52, 54 and allow load forces to be transferred from central deck section 54 to proximal deck section 52. The surface area of central deck section 54 is approximately the same size as proximal deck section 52. Other types of hinges can be used in place of hinges 94, such as multi-axis links or piano-type hinges.

Distal deck section 56 is substantially rectangular and includes a substantially linear proximal edge 100 and a spaced apart and substantially parallel and linear distal edge 102, as shown in FIG. 2. Proximal edge 100 and distal edge 102 are substantially parallel to one another and to distal edge 82 of center deck section 54. Distal deck section 56 also includes a substantially linear first side edge 104 and a spaced apart and substantially parallel and linear second side edge 106. First side edge 104 and second side edge 106 extend substantially perpendicularly between proximal edge 100 and distal edge 102. Distal deck section 56 includes a substantially planar floor 108 having a substantially planar top surface mounted on a base. Floor 108 may extend in a substantially planar manner between proximal edge 100 and distal edge 102 and between first side edge 104 and second side edge 106. Alternatively, the distal end of floor 108 may include an integrally formed downwardly extending ramp 110 at distal edge 102 as shown in FIGS. 2 and 3. Ramp 110 provides a transition surface to allow cargo to be moved from distal deck section 56 to the ground or other surface. Alternatively, a separate ramp may be pivotally coupled to distal edge 102 of distal deck section 56 to allow for a load to be moved on and off of the distal deck section 56 from the ground.

Distal deck section 56 may be formed from a plurality of elongate substantially rectangular tubular members extending substantially parallel to pivot axis 116 and arranged in a side-by-side relationship. The tubular members may be made from a light-weight metal, such as aluminum, in order to reduce the weight of the distal deck section 56. The tubular members may be welded to one another and to respective end plates at first side edge 104 and second side edge 106 of distal deck section 56. In some embodiments, distal deck section 56 is formed of a similar structure to proximal and center deck sections 52, 54. In some embodiments, the deck sections 52, 54, 56 are formed to define a top surface supported by frame structures beneath the top surface. In some embodiments, the frame structures include one or more of side supports along side edges of deck sections 52, 54, 56 and cross supports extending between the side edges of deck sections 52, 54, 56. In some embodiments, the side supports and/or cross supports are formed as tubular members. In some embodiments, the side supports and/or cross supports are formed to include at least two substantially perpendicular walls, with at least one of the walls arranged substantially perpendicular to the corresponding top surface of deck sections 52, 54, 56. In some embodiments, multiple side supports and/or cross supports are used in each deck section 52, 54, 56. When unfolded to the extended-operational position, deck sections 52, 54, 56 combine to form a continuous load-support surface 58 (along the top surfaces of floors 68, 88, 108 of the deck sections 52, 54, 56) that can vertically raise and lower cargo from the cargo floor 24 of the truck to the ground.

Figure 14:
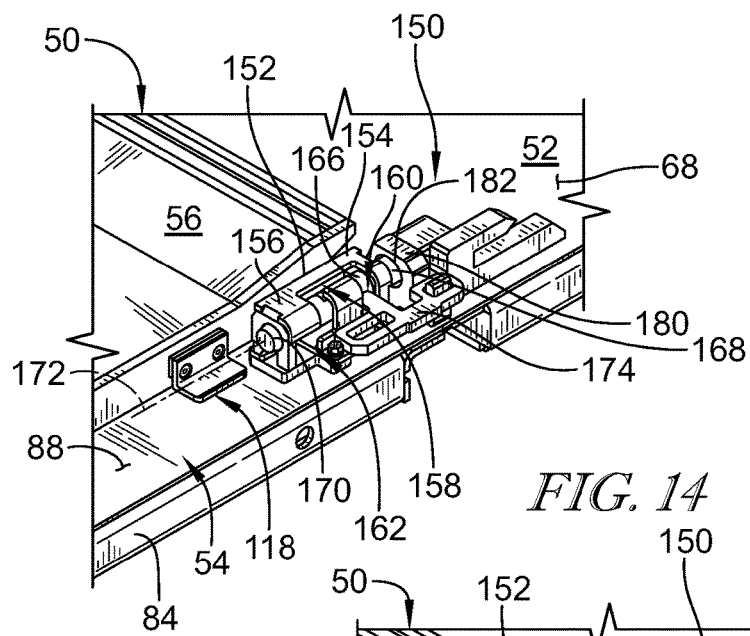
FIGS. 14-18 are a series of views showing an exemplary lock mechanism of the present disclosure and illustrating movement of a latch of the lock mechanism between a locked position and a retention position relative to a housing.
Figure 15:
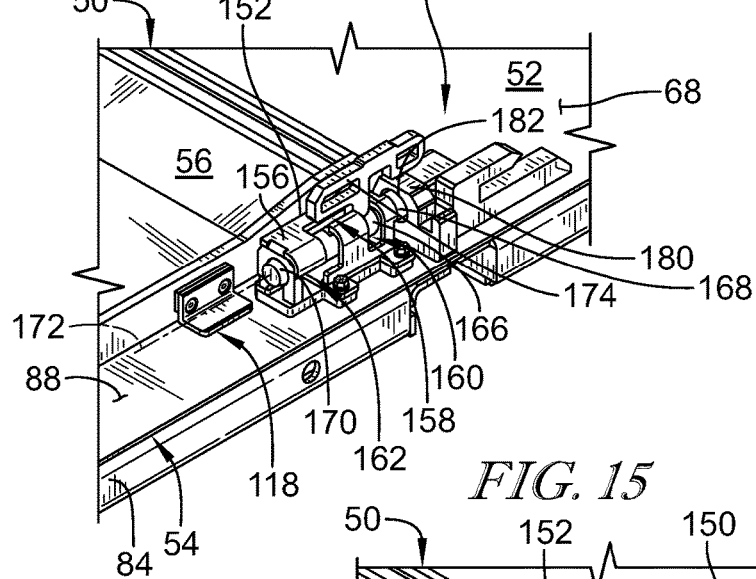
Figure 16:
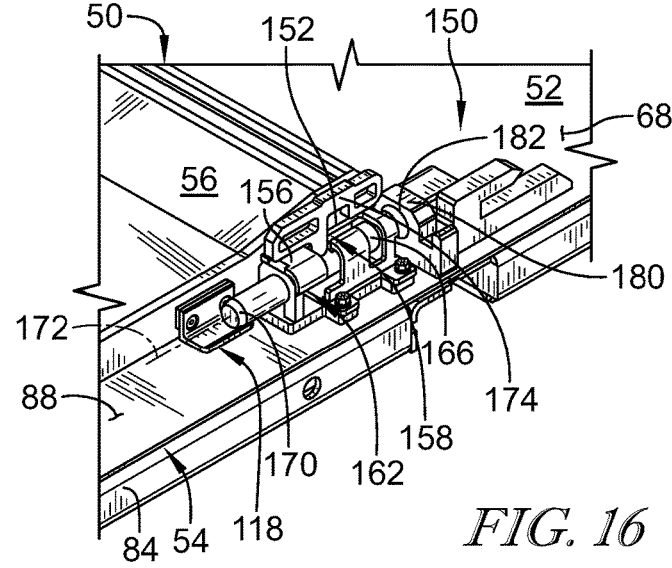
Figure 17:
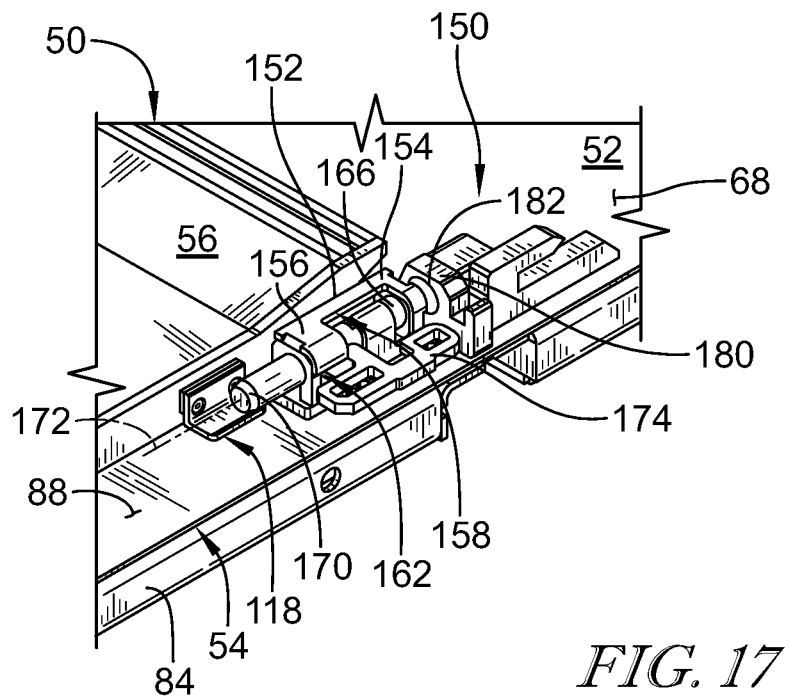

Distal deck section 56 includes a substantially planar proximal end wall 112 that extends downwardly from and substantially perpendicular to floor 108 at proximal edge 100, as shown in FIG. 4. Proximal end wall 112 of distal deck section 56 is adapted to be substantially parallel to and in abutting engagement with distal end wall 92 of center deck section 54 when center deck section 54 and distal deck section 56 are in the extended-operational position. A retention member 118, such as a tab, extends transversely outwardly from second side edge 106 of distal deck section 56, as shown in FIG. 14. Engagement of end wall 112 with end wall 92 allows load forces from distal deck section 56 to be transferred to center deck section 54. Distal deck section 56 has a surface area that is about the same size as the surface area of center deck section 54.

One or more hinges 114 pivotally couple proximal edge 100 of distal deck section 56 to distal edge 82 of center deck section 54 for pivotal movement about a substantially linear pivot axis 116, as shown in FIG. 2. Hinge 114 includes pins 111, which allow load forces from distal deck section 56 to be transferred to center deck section 54. Center deck section 54 and distal deck section 56 are pivotal with respect to one another about pivot axis 116. Pivot axis 116 is substantially parallel to pivot axes 72 and 96. In the illustrative embodiment, pivot axis 116 is located above a plane including the top surface of floors 88 and 108 of center deck section 54 and distal deck section 56 when center deck section 54 and distal deck section 56 are in the extended-operational position, such that pivot axis 96 and pivot axis 116 are located on opposite sides of the top surface of the floors of deck sections 52, 54 and 56 (e.g., the load-support surface 58) when they are in the extended-operational position. Other types of hinges can be used in place of hinges 114, such as multi-axis links or piano-type hinges. In some embodiments, center deck section 54 is arranged to pivot (e.g., about pivot axis 96) in a first direction relative to proximal deck section 52 (e.g., counter-clockwise in the orientation of FIG. 8). In some embodiments, distal deck section 56 is arranged to pivot (e.g., about pivot axis 116) in a second direction, opposite the first direction, relative to center deck section 54 (e.g., clockwise in the orientation of FIG. 11).

Liftgate 20 also includes support members 120A and 120B, as shown in FIG. 2. Each support member 120A-B extends between a first end 122 and a second end 124. First end 122 of support member 120A is coupled to a distal end of first side edge 84 of center deck section 54 and second end 124 of support member 120A is coupled to lifting post 44A. First end 122 of support member 120B is coupled to a distal end of second side edge 86 of center deck section 54 and second end 124 of support member 120B is coupled to lifting post 44B. In some embodiments, support members 120A-B are flexible, foldable or collapsible members such as a chain, cable, rope, scissors link or the like. Support members 120A-B are substantially non-elastic under tension, but are collapsible or foldable under compression.

Figure 8:
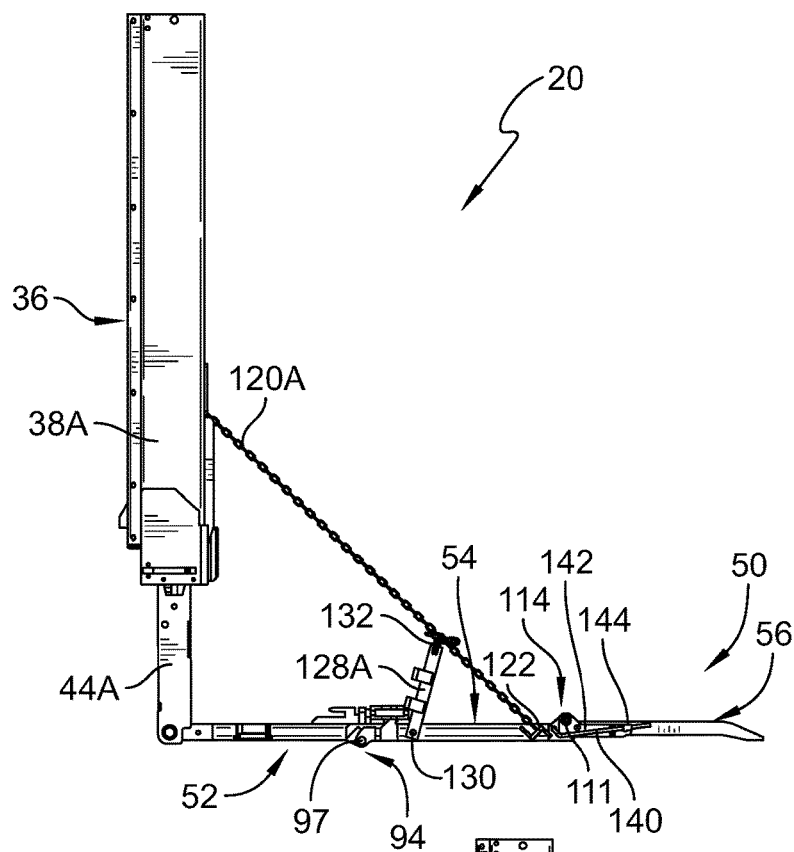
FIG. 8 is a side elevation view of the liftgate of FIG. 2.

Liftgate 20 includes stanchion 128A and stanchion 128B, as shown in FIG. 3. Each stanchion 128A-B includes a first end 130 and a second end 132 as shown in FIG. 8. First end 130 of stanchion 128A is pivotally coupled to first side edge 84 of center deck section 54. Second end 132 of stanchion 128A is coupled to support member 120A. First end 130 of stanchion 128B is coupled to second side edge 86 of center deck section 54 and second end 132 of stanchion 128B is coupled to support member 120B. Each stanchion 128A-B includes an elongate leg comprising a post or plate-like member. Stanchions 128A-B are rigid. Stanchions 128A-B are both pivotal with respect to center deck section 54 about a common substantially linear pivot axis that is substantially parallel to pivot axes 72, 96 and 116.

Liftgate 20 may include a resilient biasing member 140, such as a torsion spring, having a first end coupled to distal deck section 56 and a second end coupled to center deck section 54, as shown in FIG. 8. The first end of biasing member 140 may comprise an elongate arm 142 that extends through a receptacle 144 coupled to first side edge 104 of distal deck section 56 and that is spaced apart from distal edge 102 of distal deck section 56. Biasing member 140 is adapted to provide a resilient biasing force to distal deck section 56 for assisting in pivotal movement of distal deck section 56 about pivot axis 116. In some embodiments, biasing member 140 is configured to bias distal deck section 56 toward a vertical, upright position (e.g., perpendicular to center deck section 54 in the extended-operational position) to assist in moving the distal deck section 56 from a horizontal, flat position (e.g., parallel to center deck section 54 in the extended-operational position). This arrangement assists a user in both deploying and storing the distal deck section 56.

Liftgate 20 may include one or more lock mechanisms 150, as shown in FIGS. 14-18. Each lock mechanism 150 includes a housing 152 having a first end 154 and a second end 156. A linear passageway extends through housing 152 between first end 154 and second end 156. Housing 152 also includes an elongate slot 158 that extends in a tortuous manner between a first end 160 and a second end 162 of slot 158. Housing 152 is coupled to top surface of floor 88 of center deck section 54 with first end 154 of housing 152 located adjacent proximal edge 80 of center deck section 54 and second end 156 of housing 152 spaced apart from distal edge 82 of center deck section 54. Housing 152 may be located adjacent first side edge 84 of center deck section 54 or second side edge 86 of center deck section 54.

Lock mechanism 150 also includes a latch 166, such as an elongate substantially linear and cylindrical pin or rod, having a first end 168 and a second end 170, as shown in FIGS. 14-18. Latch 166 is located within the passageway of housing 152 and is selectively slidable with respect to housing 152 along a substantially linear axis 172 of latch 166 between a locked position and a retention position. Axis 172 is substantially perpendicular to pivot axes 72, 96 and 116. A handle 174 has a proximal end coupled to latch 166. Handle 174 extends outwardly from latch 166 through slot 158 to a distal end that is adapted to be manually grasped by a user. Lock mechanism 150 also includes a receiver 180 having a receptacle 182 adapted to removeably receive first end 168 of latch 166. Receiver 180 may comprise a substantially cylindrical tube. Receptacle 182 may comprise a passageway extending linearly through receiver 180 that is coaxially aligned with the passageway in housing 152 when center and proximal deck sections 52, 54 are aligned, such as in the extended-operational position. Receiver 180 is coupled to the top surface of floor 68 of proximal deck section 52 adjacent distal edge 62 of proximal deck section 52.

When proximal deck section 52 and center deck section 54 are in the extended-operational position, and are substantially horizontal and coplanar with one another, latch 166 may be moved from the retention position to the locked position, as shown in FIGS. 14-18, by manually moving handle 174 from second end 162 of slot 158 to first end 160 of slot 158 and thereby correspondingly sliding latch 166 along axis 172 from the retention position to the locked position. As shown in FIG. 14, first end 168 of latch 166 is received in receptacle 182 of receiver 180 when latch 166 is in the locked position, such that latch 166 locks proximal deck section 52 and center deck section 54 together and blocks movement of center deck section 54 and proximal deck section 52 with respect to one another about pivot axis 72. Latch 166 may be moved from the locked position to the retention position by manually moving handle 174 from first end 160 of slot 158 to second end 162 of slot 158 and correspondingly sliding latch 166 along axis 172 from the locked position to the retention position as shown in FIGS. 15-18, wherein first end 168 of latch 166 is removed from receiver 180 and second end 170 of latch 166 projects outwardly beyond second end 156 of housing 152. Latch 166 is thereby removed from receptacle 182 of receiver 180 such that proximal deck section 52 and center deck section 54 may pivot with respect to one another about pivot axis 72. In the illustrative embodiment, handle 174 engages with receiver 180 in the locked position.

Figure 7:
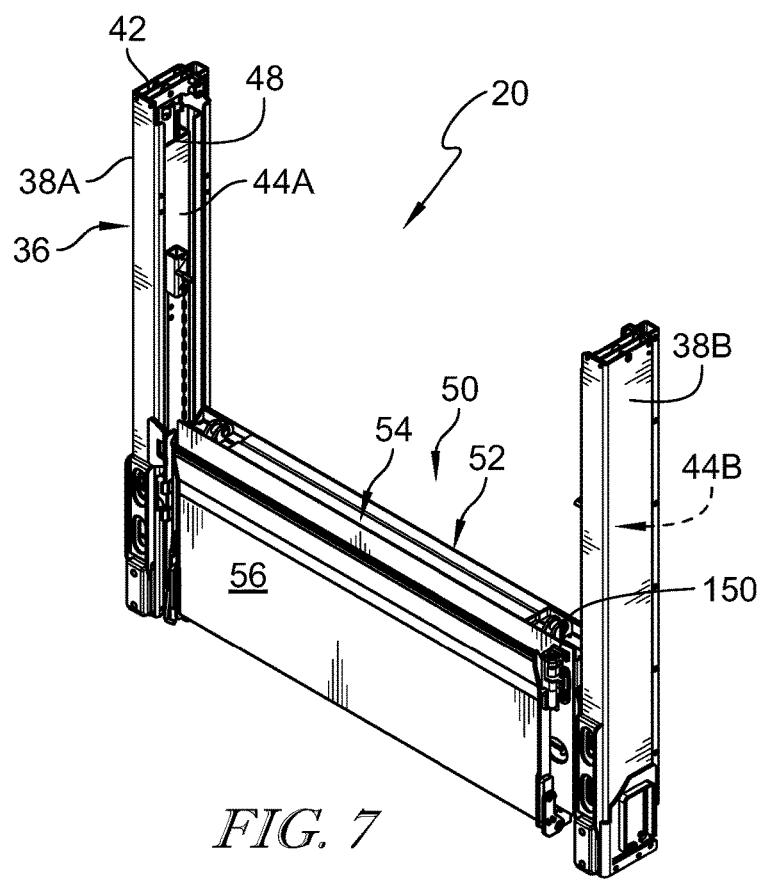
FIG. 7 is a view similar to FIG. 6 showing the load platform in the retracted-stored position and moved to the raised position.

Load platform 50 is selectively moveable in the extended-operational position by lift mechanism 36 between a lowered position as shown in FIG. 2, wherein load platform 50 is located at a height below the height of cargo floor 24 of vehicle 22, and a raised position wherein the top surface of load platform 50 is located substantially coplanar with the top surface of cargo floor 24 (e.g., along rear edge 26) of vehicle 22 for movement of cargo between load platform 50 and cargo floor 24 as shown in FIG. 3. Load platform 50 is also selectively moveable or foldable between the extended-operational position as shown in FIG. 2 and a retracted-stored position as shown in FIGS. 6 and 7. Load platform 50 is also selectively moveable in the retracted-stored position by lift mechanism 36 between a lowered position (FIG. 6) and a raised position (FIG. 7). When load platform 50 is in the extended-operational position as shown in FIG. 2, proximal deck section 52, center deck section 54 and distal deck section 56 are located in extended positions substantially horizontal and coplanar with one another, and such that the top surfaces of floors 68, 88, and 108 are substantially horizontal and coplanar with one another. When load platform 50 is in the extended-operational position, proximal edge 60 of proximal deck section 52 is vertically supported by lifting posts 44A-B and distal edge 82 of center deck section 54 is vertically supported by support members 120A-B. When load platform 50 is in the extended-operational position, distal deck section 56 extends outwardly from distal edge 82 of center deck section 54 for supporting cargo. In the illustrative embodiment, distal deck section 56 is cantilevered relative to center deck section 54 with proximal end wall 112 of distal deck section 56 being in abutting engagement with distal end wall 92 of center deck section 54, such that distal deck section 56 is self-supporting. In some embodiments, one or more support members can be coupled to distal deck section 56 to support distal deck section 56 when load platform 50 is in the extended-operational position.

Figure 9:
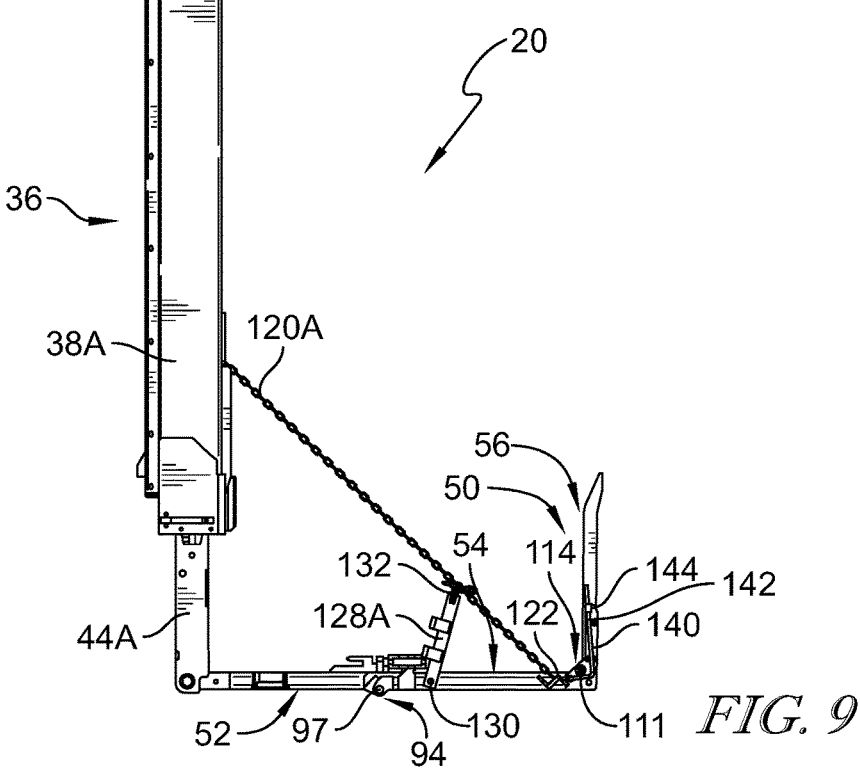
FIG. 9 is a view similar to FIG. 8 showing the distal deck section transitioning from the extended-operational position toward the retracted-stored position.
Figure 10:
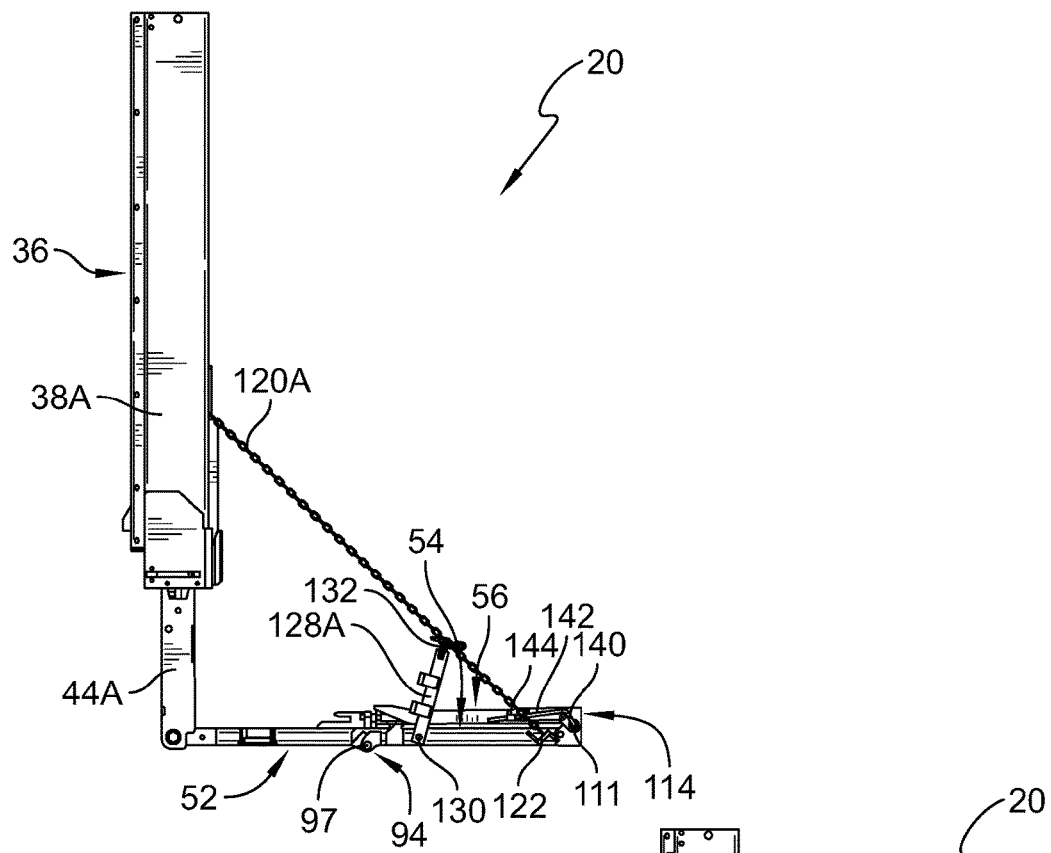
FIG. 10 is a side elevation view of the liftgate of FIG. 4.

When it is desired to retract load platform 50 from the extended-operational position, as shown in FIG. 2, to the retracted-stored position, distal deck section 56 is manually folded or pivoted about pivot axis 116 with respect to center deck section 54 until distal deck section 56 overlies center deck section 54, as shown in FIGS. 4, 9, and 10, with floor 108 being substantially parallel to and in close proximity to floor 88. Biasing member 140 provides a resilient biasing force in a counter-clockwise direction, as viewed in FIG. 8, about pivot axis 116 to assist in the pivoting movement of distal deck section 56 about pivot axis 116 toward a substantially vertical orientation.

Figure 18:
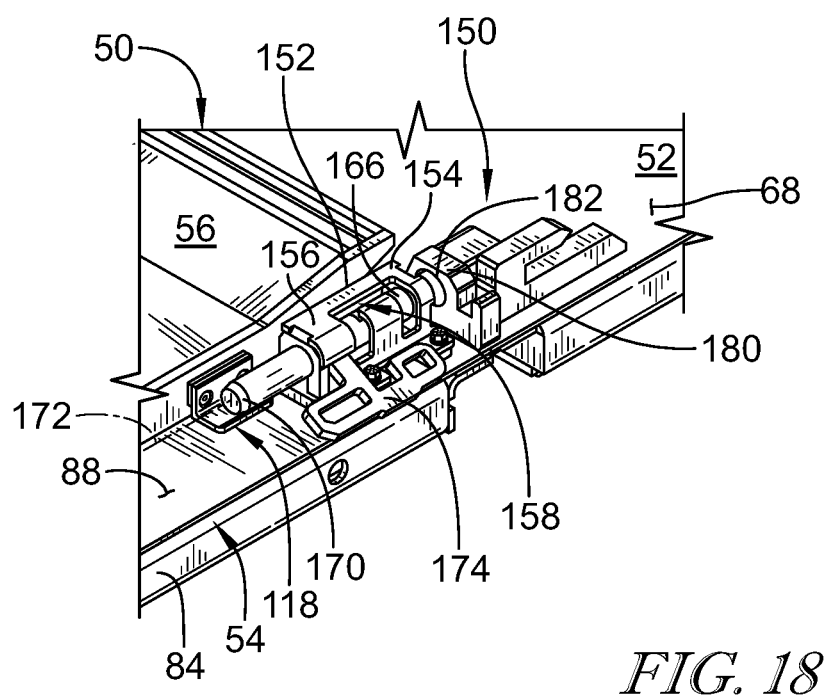

When distal deck section 56 is folded over onto center deck section 54, as shown in FIGS. 4 and 9, latch 166 of lock mechanism 150 is moved from the locked position of latch 166 to the retention position of latch 166 wherein latch 166 is released from receiver 180 such that center deck section 54 and proximal deck section 52 are unlocked from one another to allow pivotal movement therebetween about pivot axis 72. When latch 166 is moved to the retention position of latch 166, second end 170 of latch 166 retains retention member 118 of distal deck section 56 between second end 170 of latch 166 and center deck section 54 as shown in FIG. 18. Latch 166 thereby blocks unwanted pivotal movement of distal deck section 56 with respect to center deck section 54 about pivot axis 116 and locks distal deck section 56 in the folded position with respect to center deck section 54. In the illustrative embodiment, lock mechanism 150 is arranged such that latch 166 moves between the retention position and locked position, and movement of latch 166 from the retention position to the locked position both releases distal deck section 56 to allow it to unfold relative to center deck section 54 and blocks folding of center deck section 54 relative to proximal deck section 52.

Figure 11:
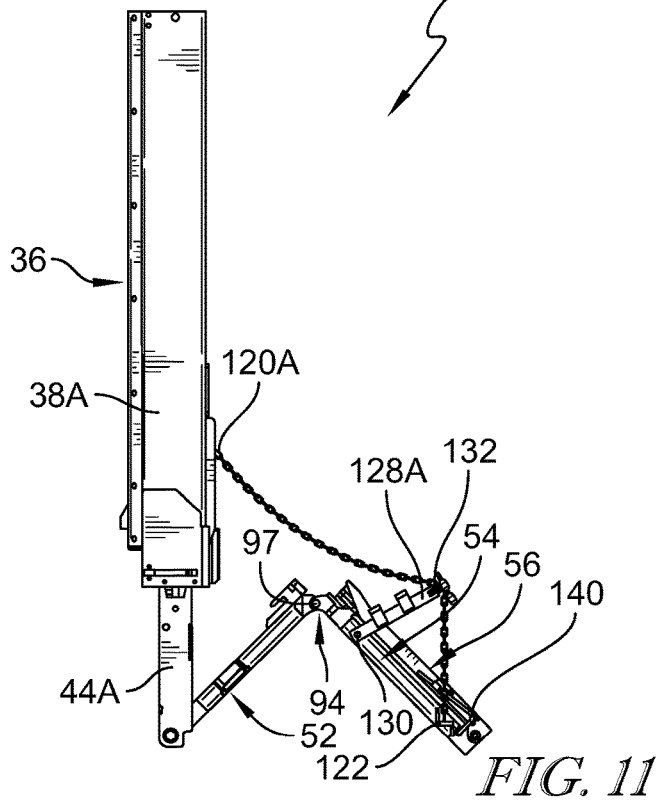
FIG. 11 is a side elevation view of the liftgate of FIG. 5.

Proximal deck section 52 is then pivoted in a counter-clockwise direction about pivot axis 72, as viewed in FIG. 11, whereupon proximal deck section 52 and center deck section 54 pivot and fold with respect to one another about pivot axis 96. Proximal deck section 52 may be pivoted between the extended-operational position and the retracted-stored position about pivot axis 72 by an actuator, such as for example, a hydraulic cylinder. Proximal deck section 52 continues to be pivoted in a counter-clockwise direction about pivot axis 72 until load platform 50 is in the retracted-stored position as shown in FIGS. 12 and 13, wherein proximal deck section 52, center deck section 54 and distal deck section 56 are retracted and folded with respect to one another such that the deck sections are in a tri-fold configuration and substantially parallel to one another with floors 68, 88, and 108 being substantially parallel to one another. Lift mechanism 36 may selectively raise or lower load platform 50 with respect to cargo floor 24 of vehicle 22 when load platform 50 is in the retracted-stored position.

When it is desired to extend load platform 50 from the retracted-stored position, as shown in FIGS. 12 and 13, to the extended-operational position, as shown in FIG. 2, proximal deck section 52 is pivoted in a clockwise direction about pivot axis 72, as viewed in FIGS. 12 and 13, such that proximal deck section 52 and center deck section 54 pivot with respect to one another about pivot axis 96 until proximal deck section 52 and center deck section 54 are substantially horizontal with floors 68 and 88 being substantially coplanar with one another, as shown in FIG. 10, and with distal deck section 56 folded over and overlying center deck section 54.

Latch 166 of lock mechanism 150 is then moved from the retention position to the locked position of latch 166 wherein first end 168 of latch 166 is received in receptacle 182 of receiver 180 such that center deck section 54 is locked to proximal deck section 52, and such that proximal deck section 52 and center deck section 54 are blocked from pivoting with respect to one another about pivot axis 96. Once latch 166 is moved from the retention position to the locked position, second end 170 of latch 166 releases the retention member 118 of distal deck section 56 from lock mechanism 150, such that distal deck section 56 is selectively pivotal with respect to center deck section 54 about pivot axis 116.

Distal deck section 56 is then manually pivoted in a clockwise direction about pivot axis 116 with respect to center deck section 54. Biasing member 140 provides a resilient biasing force in the clockwise direction, as viewed in FIG. 10, to distal deck section 56 to assist in the manual pivoting of distal deck section 56 from the retracted folded-over position toward an upright vertical position. Distal deck section 56 is pivoted in a clockwise direction about pivot axis 96 to the extended-operational position, as shown in FIG. 8, wherein distal deck section 56 is substantially horizontal and floor 108 of distal deck section 56 is substantially co-planar with floors 68 and 88 of proximal deck section 52 and center deck section 54.

The locking of center deck section 54 to proximal deck section 52 by lock mechanism 150, when both deck sections 52 and 54 are in the extended-operational position, blocks unintended pivotal movement of proximal deck section 52 and center deck section 54 with respect to one another about pivot axis 96 when cargo or a downward force is applied to distal deck section 56 that may otherwise cause pivotal movement of proximal deck section 52 and center deck section 54 with respect to one another about pivot axis 96 and which may otherwise cause damage or injury. The locking of distal deck section 56 to center deck section 54 by lock mechanism 150 when load platform 50 is in the retracted-stored position blocks unintended pivotal movement of distal deck section 56 with respect to center deck section 54 about pivot axis 116 from the retracted-stored position which may otherwise cause damage or injury.

The depth distance of proximal deck section 52, center deck section 54 and distal deck section 56, between their distal edges and proximal edges, may all be approximately equal to one another. If desired, the depth distance of each deck section between their proximal edge and distal edge may be, for example, 24 inches, 30 inches, 36 inches or 42 inches, among other depths contemplated by the present disclosure. In some embodiments, the depth of distal deck section 56 is less than the depth of center deck section 54. The depth of the deck sections 52, 54 and 56 may be selected such that the top ends of deck sections 52, 54 and 56, when load platform 50 is in the retracted-stored position and in the lowered position as shown in FIG. 13, do not extend above a height (H) of the cargo floor 24 of vehicle 22, such that load platform 50 does not block access to the cargo area of vehicle 22 when load platform 50 is in the retracted-stored position.

Figure 19:
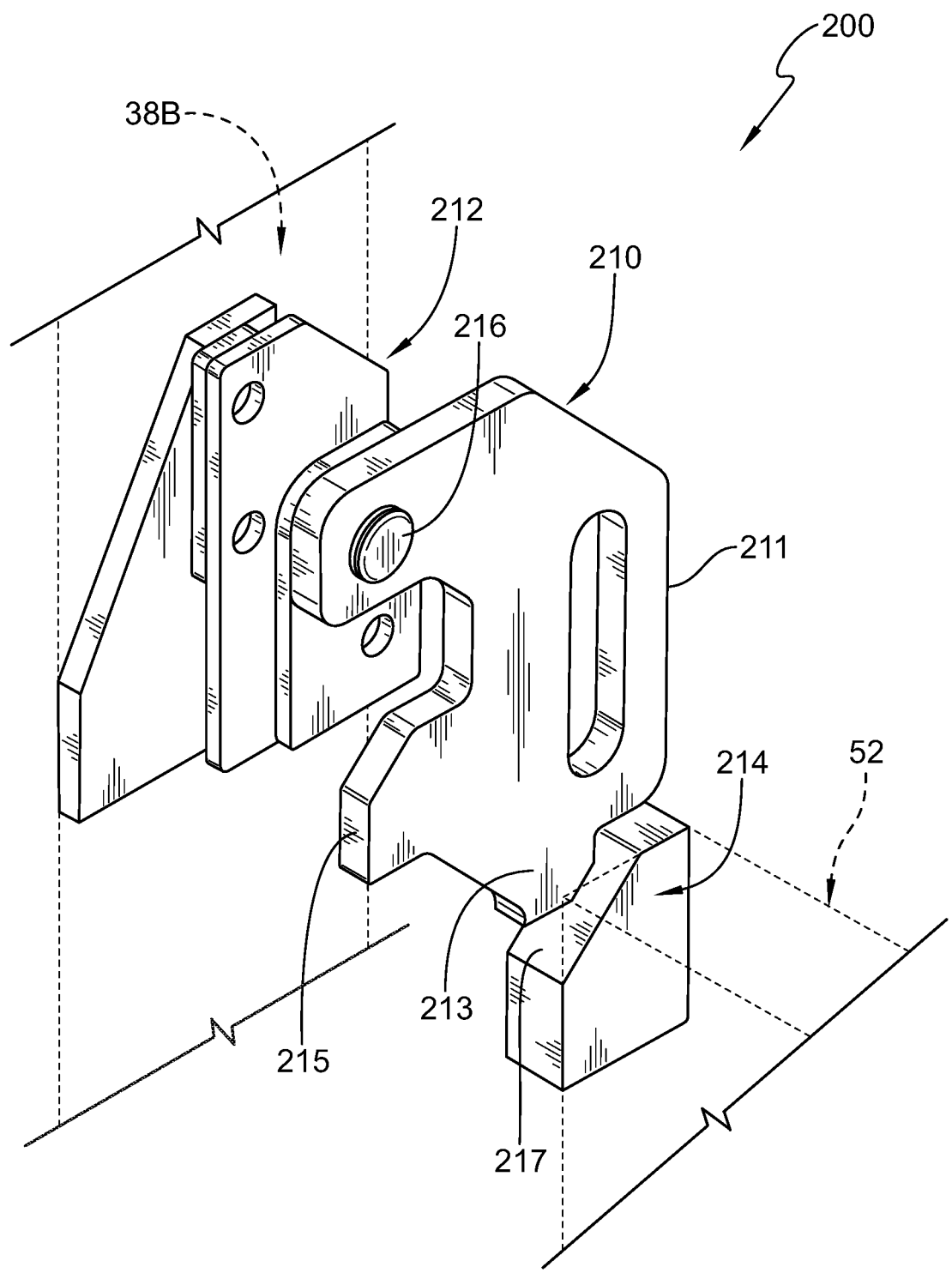
FIG. 19 is a perspective view of an exemplary platform stop in accordance with the present disclosure showing that a pawl of the platform stop is pivotably coupled to the lift mechanism and suggesting that the pawl is movable between a blocking position and a passing position.
Figures 20, 21:
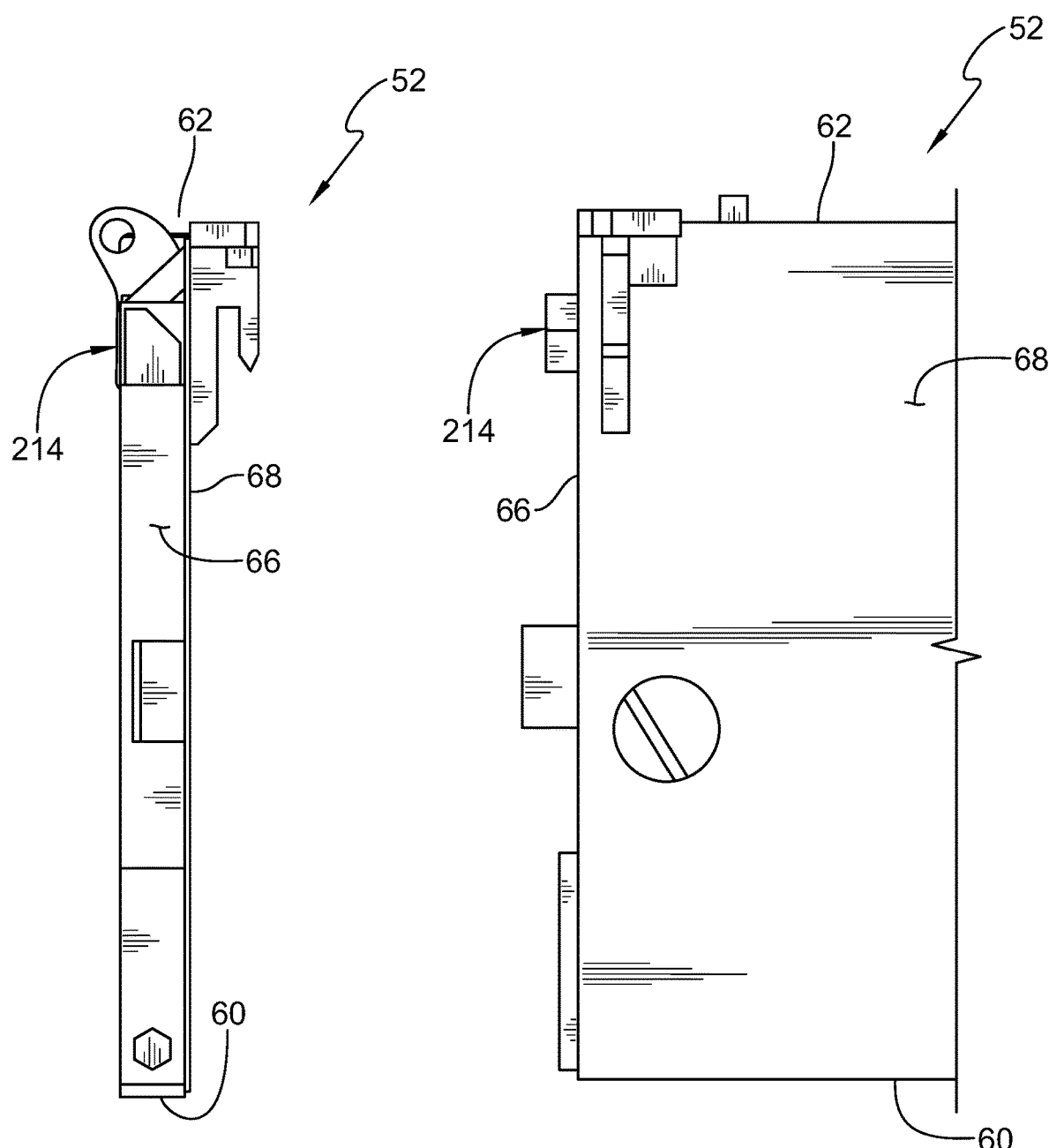
FIG. 20 is a side elevation view of the proximal deck section of the load platform.
FIG. 21 is a partial rear elevation view of the proximal deck section of FIG. 20.

In some embodiments, one or more platform stops 200 is arranged to selectively block movement of load platform 50 from the lowered position to the raised position as shown in FIG. 19. In the illustrative embodiment, platform stop 200 includes a pawl 210 pivotably coupled to column 38B and a wedge 214 coupled to proximal deck section 52. Wedge 214 is coupled to second side edge 66 of proximal deck section 52 adjacent to distal edge 62 as shown in FIGS. 20 and 21. A mounting plate 212 is coupled to column 38B and a pin 216 extends toward the opposite column 38A as shown in FIG. 19. Pawl 210 is mounted on pin 216 for movement between a blocking position, shown in FIG. 19, and a passing position where pawl 210 is pivoted about pin 216 (e.g., counter-clockwise in the perspective of FIG. 19) to remove pawl 210 from the path of wedge 214. Pawl 210 includes a side edge 211, a foot 213 and an arm 215 extending outward from pawl 210 in substantially perpendicular directions. In the blocking position, foot 213 is arranged to engage a sloped surface 217 of wedge 214 and arm 215 is arranged to engage with a portion of vehicle 22 (such as rear edge 26) or another portion of liftgate 20 to block pivoting of pawl 210 (e.g., in a clockwise direction in the perspective of FIG. 19). In some embodiments, pawl 210 engages with proximal deck section 52 or another portion of load platform 50 or lift mechanism 36, such as lifting post 44B. In some embodiments, pawl 210 is pivotably mounted to column 38B without mounting plate 212.

In the illustrative embodiment, proximal deck section 52, center deck section 54, and distal deck section 56 together form a load-bearing surface (or load area) of load platform 50. Proximal deck section 52, center deck section 54, and distal deck section 56 each have substantially similar load-bearing capabilities such that a load (e.g., cargo from vehicle 22) can be moved along load platform 50 and be supported while load platform 50 is in a raised position away from other supporting surfaces (e.g., the ground or a loading dock). For example, a load can be supported on any of proximal deck section 52, center deck section 54, or distal deck section 56, or the load can be supported across multiple of proximal deck section 52, center deck section 54, and distal deck section 56.

In illustrative embodiments, load platform 50 can define an overall load area width of about 80 inches and an overall load area length of about 84 inches. For example, the proximal and center deck sections 52, 54 can each be about 30 inches deep, and the distal deck section 56 can be 24 inches deep (excluding ramp/transition surface). In some embodiments, load platform 50 can support a "water level load" (i.e., evenly distributed across the entire load area) of about 5500 pounds or more with the load platform 50 spaced apart from supporting surfaces, such as the ground or loading dock. In some embodiments, load platform 50 can support loads of varying maximum weight depending on a center of mass for the load. For example, in some embodiments, load platform 50 can support about 5500 pounds or more with the center of mass for the load located about 42 inches from the proximal edge 60 of proximal deck section 52, as shown, for example in FIG. 22. In some embodiments, load platform 50 can support about 4800 pounds or more with the center of mass for the load located about 48 inches from the proximal edge 60 of proximal deck section 52. In some embodiments, load platform 50 can support about 4300 pounds or more with the center of mass for the load located about 54 inches from the proximal edge 60 of proximal deck section 52. In some embodiments, load platform 50 can support about 3800 pounds or more with the center of mass for the load located about 60 inches from proximal edge 60 of proximal deck section 52. In some embodiments, load platform 50 can support about 3500 pounds or more with the center of mass for the load located about 66 inches from the proximal edge 60 of proximal deck section 52. In some embodiments, load platform 50 can support about 3200 pounds or more with the center of mass for the load located about 72 inches from the proximal edge 60 of proximal deck section 52. Critically, the relative load support capacity of the load platform 50 at a center of the distal deck section 56 compared to a center of the load platform 50 is at least 0.25 (25 percent) or greater. For example, in the illustrative embodiment, the relative load support capacity at the center of the distal deck section 56 (e.g., 3200 pounds at 72 inches) compared to the load support capacity at the center of the load platform 50 (e.g., 5500 pounds at 42 inches) is about 0.58 (58 percent). In another example, load platform 50 could be smaller where the relative load support capacity at the center of the distal deck section 56 (e.g., about 875 pounds) compared to the load support capacity at the center of the load platform 50 (e.g., about 3500 pounds) is about 0.25 (25 percent).

Other load platforms are about 60 inches deep having two substantially even depth deck sections of about 30 inches a piece. In some embodiments, load platform 50 with three deck sections 52, 54, 56 can have a depth of about 90 inches with each deck section 52, 54, 56 being about 30 inches deep, representing a 50 percent increase in depth over other load platforms of similar load capacity. Still other load platforms are about 72 inches deep having two substantially even depth deck sections of about 36 inches a piece. In some embodiments, load platform 50 with three deck sections 52, 54, 56 can have a depth of about 102 inches with deck section 52, 54 being about 36 inches deep and deck section 56 being about 30 inches deep, representing a 40 percent increase in depth over other load platforms of similar load capacity. Still other load platforms are about 84 inches deep having two substantially even depth deck sections of about 42 inches a piece. In some embodiments, load platform 50 with three deck sections 52, 54, 56 can have a depth of about 114 inches with deck section 52, 54 being about 42 inches deep and deck section 56 being about 30 inches deep, representing a 35 percent increase in depth over other load platforms of similar load capacity.

Another embodiment of a liftgate 320 in accordance with the present disclosure is shown in FIG. 23. Liftgate 320 is similar to liftgate 20, and similar numbers in the 300's are used to identify similar portions. Liftgate 320 includes a lift mechanism 336 and a load platform 350 coupled to lift mechanism 336. Load platform 350 includes a proximal deck section 352 coupled to lift mechanism 336, a center deck section 354 coupled to proximal deck section 352, and a distal deck section 356 coupled to center deck section 354. At least one difference between liftgate 320 and liftgate 20 is that liftgate 320 includes a foldable ramp 310 pivotably coupled to a distal end of distal deck section 356. Foldable ramp 310 is movable between a use position where foldable ramp 310 extends away from distal deck section 356 and a storage position (shown in phantom in FIG. 23) where foldable ramp 310 extends along distal deck section 356. In the illustrative embodiment, a hinge 319 couples foldable ramp 310 with distal deck section 356.

The embodiment(s) detailed hereinabove may be combined in full or in part, with any alternative embodiment(s) described.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A liftgate for use with a vehicle, the liftgate comprising:
a lift mechanism coupled to the vehicle; and
a moveable load platform coupled to the lift mechanism for movement between a lowered position and a raised position, the load platform including:
 a proximal deck section coupled to the lift mechanism;
 a distal deck section; and
 a center deck section positioned between the proximal deck section and the distal deck section,
wherein the proximal deck section, center deck section, and distal deck section are pivotally coupled to one another such that the load platform is selectively moveable between an extended-operational position where the proximal, center, and distal deck sections are located substantially coplanar with one another for supporting a load and a retracted-stored position where the proximal, center, and distal deck sections are folded with respect to one another and are located substantially parallel and adjacent to one another,
wherein the distal deck section is cantilevered from and fully supported by the center deck section without any other external support when the proximal, center, and distal deck sections are in the extended-operational position and the load platform in the raised position,
wherein the load platform is configured to provide a first load carrying capacity with a center of mass of the load arranged at a center of the load platform, wherein the load platform is configured to provide a second load carrying capacity with a center of mass of the load arranged at a center of the distal deck section, and wherein the second load carrying capacity is at least 25 percent of the first load carrying capacity,
wherein the center deck section is pivotable in a first direction about a first pivot axis relative to the proximal deck section with movement of the load platform from the retracted-stored position to the extended-operational position and the distal deck section is pivotable in a second direction about a second pivot axis relative to the center deck section with movement of the load platform from the retracted-stored position to the extended-operational position, and wherein the first direction is opposite of the second direction, and
wherein the load platform defines an upper load-support surface in the extended-operational position, wherein the first pivot axis is below the load-support surface in the extended-operational position, and wherein the second pivot axis is above the load-support surface in the extended-operational position.

2. The liftgate of claim 1, wherein, in the retracted-stored position, upper edges of the proximal, center, and distal deck sections are arranged at or below a floor of the vehicle with the load platform in the lowered position.

3. The liftgate of claim 1, wherein the center deck section is pivotable about a first axis relative to the proximal deck section, wherein the distal deck section is pivotable about a second axis relative to the center deck section, and wherein the first axis is spaced apart from and substantially parallel to the second axis.

4. The liftgate of claim 1, further comprising a lock mechanism movable between a locked position and a retention position, wherein the lock mechanism, in the locked position, is configured to engage with the center deck section and the proximal deck section to block pivoting of the center deck section relative to the proximal deck section in the extended-operational position.

5. The liftgate of claim 4, wherein the lock mechanism, in the retention position, is configured to engage with the distal deck section and the center deck section to block pivoting of the distal deck section relative to the center deck section in the retracted-stored position.

6. The liftgate of claim 5, wherein the lock mechanism includes a housing, a receiver, and a latch, and wherein the latch is movable between the locked position and the retention position relative to the housing.

7. The liftgate of claim 6, wherein the housing is coupled to the center deck section, the receiver is coupled to the proximal deck section, and the latch is coupled to the housing.

8. The liftgate of claim 6, further comprising a handle coupled to the latch, wherein an elongated slot is formed in the housing and arranged in a tortuous manner between a first end and a second end of the slot, wherein the handle extends in to the slot, wherein the handle is arranged at the first end of the slot in the locked position and the slot is configured to engage with the handle to block movement of the latch toward the retention position, and wherein the handle is arranged at the second end of the slot in the retention position and the slot is configured to engage with the handle to block movement of the latch toward the locked position.

9. The liftgate of claim 1, wherein the proximal, center, and distal deck sections each define a portion of an upper load-support surface of the load platform in the extended-operational position, and wherein each portion of the load-support surface defined by the proximal, center, and distal deck sections is configured to support the load in the raised position.

10. The liftgate of claim 1, wherein the first load carrying capacity is at least 3500 pounds, and wherein the second load carrying capacity is at least 875 pounds.

11. The liftgate of claim 1, further comprising a pawl pivotably coupled to the lift mechanism and movable between a blocking position and a passing position, wherein the pawl is configured to engage with the load platform in the blocking position to block movement of the load platform toward the raised position, and wherein the pawl is movable by a user to the passing position to allow the load platform to move toward the raised position.

12. The liftgate of claim 1, wherein floors of the proximal, center, and distal deck sections each define a portion of an upper load-support surface of the load platform in the extended-operational position, wherein each floor defines respective proximal and distal edges, and wherein depths of the proximal, center, and distal deck sections are defined between the proximal and distal edges of their respective floors.

13. The liftgate of claim 12, wherein the depths of the proximal, center, and distal deck sections are substantially the same.

14. The liftgate of claim 12, wherein the depths of the proximal and center deck sections are substantially the same, and wherein the depth of the distal deck section is less than the depths of the proximal and center sections.

15. The liftgate of claim 12, wherein the depths of the proximal, center, and distal deck sections are each within a range of about 24 inches to about 42 inches.

16. The liftgate of claim 15, wherein the depths of the proximal and center deck sections are each within a range of about 24 inches to about 42 inches, and wherein the depth of the distal deck section is within a range of about 18 inches to about 30 inches.

17. The liftgate of claim 15, wherein the depths of the proximal and center deck sections are each within a range of about 30 inches to about 42 inches, and wherein the depth of the distal deck section is within a range of about 24 inches to about 30 inches.

18. A liftgate for use with a vehicle, the liftgate comprising:
a lift mechanism coupled to the vehicle; and
a moveable load platform coupled to the lift mechanism for movement between a lowered position and a raised position, the load platform including:
a proximal deck section coupled to the lift mechanism;
a distal deck section;
a center deck section positioned between the proximal deck section and the distal deck section; and
a foldable ramp pivotally coupled to the distal deck section,
wherein the proximal deck section, center deck section, and distal deck section are pivotally coupled to one another such that the load platform is selectively moveable between an extended-operational position where the proximal, center, and distal deck sections are located substantially coplanar with one another for supporting a load and a retracted-stored position where the proximal, center, and distal deck sections are folded with respect to one another and are located substantially parallel and adjacent to one another,
wherein the distal deck section is cantilevered from and fully supported by the center deck section without any other external support when the proximal, center, and distal deck sections are in the extended-operational position and the load platform in the raised position,
wherein the foldable ramp is movable between a use position where the foldable ramp extends away from the distal deck section and a storage position where the foldable ramp extends along the distal deck section,
wherein the load platform is configured to provide a first load carrying capacity with a center of mass of the load arranged at a center of the load platform, wherein the load platform is configured to provide a second load carrying capacity with a center of mass of the load arranged at a center of the distal deck section, and wherein the second load carrying capacity is at least 25 percent of the first load carrying capacity,
wherein the center deck section is pivotable in a first direction about a first axis relative to the proximal deck section with movement of the load platform from the retracted-stored position to the extended-operational position and the distal deck section is pivotable in a second direction about a second axis relative to the center deck section with movement of the load platform from the retracted-stored position to the extended-operational position, and wherein the first direction is opposite of the second direction, and
wherein the load platform defines an upper load-support surface in the extended-operational position, wherein the first axis is below the load-support surface in the extended-operational position, and wherein the second axis is above the load-support surface in the extended-operational position.

19. A liftgate for use with a vehicle, the liftgate comprising:
a lift mechanism coupled to the vehicle; and
a moveable load platform coupled to the lift mechanism for movement between a lowered position and a raised position, the load platform including:
a proximal deck section coupled to the lift mechanism;
a distal deck section;
a center deck section positioned between the proximal deck section and the distal deck section; and
a lock mechanism,
wherein the proximal deck section, center deck section, and distal deck section are pivotally coupled to one another such that the load platform is selectively moveable between an extended-operational position where the proximal, center, and distal deck sections are located substantially coplanar with one another for supporting a load and a retracted-stored position where the proximal, center, and distal deck sections are folded with respect to one another and are located substantially parallel and adjacent to one another,
wherein the distal deck section is cantilevered from and fully supported by extends away from the center deck section without any other external support when the proximal, center, and distal deck sections are in the extended-operational position and the load platform in the raised position,
wherein the load platform is configured to provide a first load carrying capacity with a center of mass of the load arranged at a center of the load platform, the load platform is configured to provide a second load carrying capacity with a center of mass of the load arranged at a center of the distal deck section, and the second load carrying capacity is at least 25 percent of the first load carrying capacity,
wherein the lock mechanism is movable between a locked position and a retention position, the lock mechanism, in the locked position, is configured to engage with the center deck section and the proximal deck section to block pivoting of the center deck section relative to the proximal deck section in the extended-operational position, and the lock mechanism, in the retention position, is configured to engage with the distal deck section and the center deck section to block pivoting of the distal deck section relative to the center deck section in the retracted-stored position, wherein the center deck section is pivotable in a first direction about a first axis relative to the proximal deck section with movement of the load platform from the retracted-stored position to the extended-operational position and the distal deck section is pivotable in a second direction about a second axis relative to the center deck section with movement of the load platform from the retracted-stored position to the extended-operational position, and wherein the first direction is opposite of the second direction, and wherein the load platform defines an upper load-support surface in the extended-operational position, wherein the first axis is below the load-support surface in the extended-operational position, and wherein the second axis is above the load-support surface in the extended-operational position.

\* \* \* \* \*